United States Patent
Sugawara

(10) Patent No.: US 6,628,874 B1
(45) Date of Patent: Sep. 30, 2003

(54) OPTICAL COMPONENT FORMED BY PLURAL MULTICORE OPTICAL FIBERS

(75) Inventor: Takeo Sugawara, Hamamatsu (JP)

(73) Assignee: Hamamatsu Photonics K.K., Hamamatsu (JP)

( * ) Notice: Subject to any disclaimer, the term of this patent is extended or adjusted under 35 U.S.C. 154(b) by 29 days.

(21) Appl. No.: 09/694,313

(22) Filed: Oct. 24, 2000

Related U.S. Application Data

(63) Continuation-in-part of application No. PCT/JP99/01486, filed on Mar. 24, 1999.

(30) Foreign Application Priority Data

Apr. 27, 1998 (JP) ......................................... P10-117479

(51) Int. Cl.$^7$ ................................................ G02B 6/02
(52) U.S. Cl. ........................ 385/127; 385/123; 385/115; 385/116; 385/901
(58) Field of Search ................................. 385/127, 123, 385/128, 115, 116, 141, 142, 901, 126; 128/303.1

(56) References Cited

U.S. PATENT DOCUMENTS

| | | | | |
|---|---|---|---|---|
| 3,823,997 A | * | 7/1974 | Gloge et al. ................ | 385/124 |
| 4,000,416 A | * | 12/1976 | Goell ........................... | 340/635 |
| 4,465,335 A | * | 8/1984 | Eppes .......................... | 359/900 |
| 4,669,467 A | * | 6/1987 | Willett et al. ............. | 128/303.1 |
| 4,815,079 A | * | 3/1989 | Snitzer et al. .................. | 372/6 |
| 5,732,178 A | * | 3/1998 | Terasawa et al. ........... | 385/127 |
| 6,097,870 A | * | 8/2000 | Ranka et al. ................ | 385/122 |

FOREIGN PATENT DOCUMENTS

| | | | | |
|---|---|---|---|---|
| JP | 55-40483 | 3/1980 | .................. | 385/127 |
| JP | 61-88206 | 5/1986 | .................. | 385/127 |
| JP | 10-104444 | 4/1998 | .................. | 385/127 |

* cited by examiner

*Primary Examiner*—Brian Healy
(74) *Attorney, Agent, or Firm*—Morgan, Lewis & Bockius LLP

(57) ABSTRACT

An optical component 10 has a plurality of optical fibers comprising a first core 12, a second core 14 formed around the first core 12, and a clad 16 formed around the second core 14, arrayed regularly so that the fiber axes may be parallel to each other, having an incident plane 10a cut obliquely to the fiber axis and an exit plane 10b cut vertically to the fiber axis. The refractive index $n_2$ of the second core 14 is smaller than the refractive index $n_1$ of the first core 12, and the refractive index $n_c$ of the clad 16 is smaller than the refractive index $n_2$ of the second core 14, and further the refractive index $n_1$ of the first core 12, the refractive index $n_2$ of the second core 14, and the refractive index $n_c$ of the clad 16 satisfy the relation of $n_1^2 - n_2^2 = n_2^2 - n_c^2$.

6 Claims, 11 Drawing Sheets

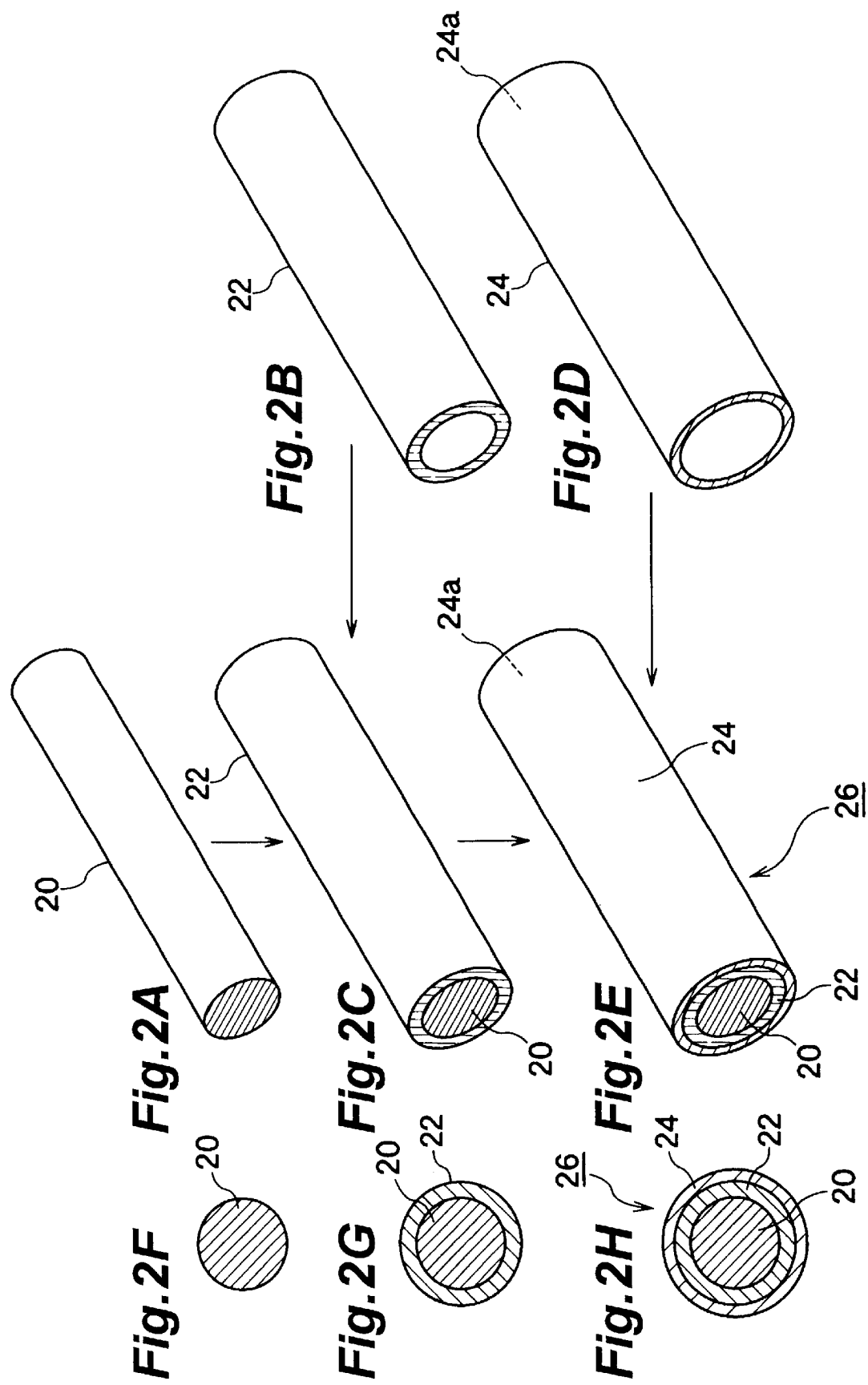

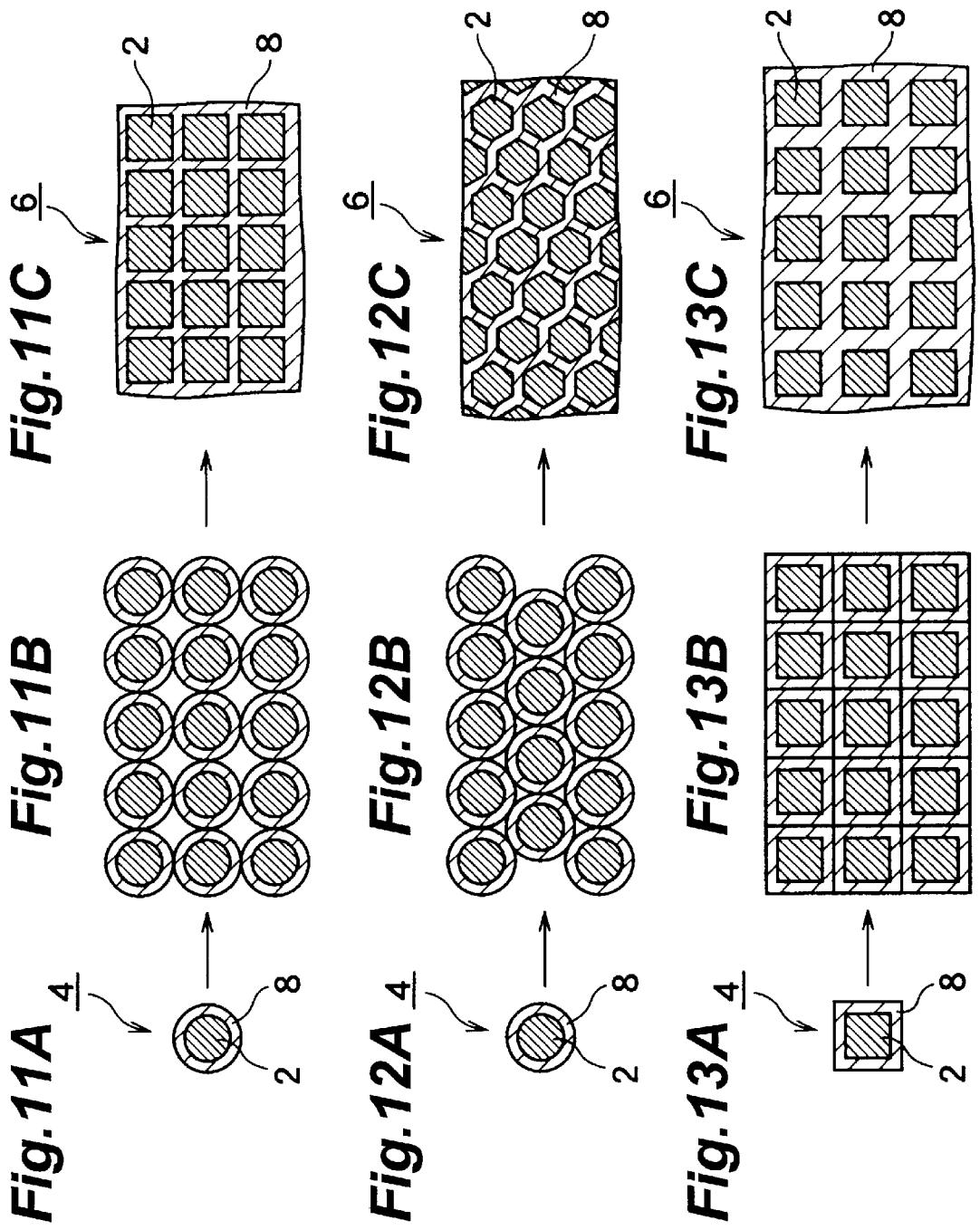

OPTICAL COMPONENT FORMED BY PLURAL MULTICORE OPTICAL FIBERS

RELATED APPLICATION

The present application is a continuation-in-part application of PCT application No. PCT/JP99Z01486 filed on Mar. 24, 1999, designating U.S.A. and now pending.

BACKGROUND OF THE INVENTION

1. Field of the invention

The present invention relates to an optical component composed by arraying a plurality of optical fibers.

2. Related Background Art

As an optical component for transmitting optical images, an optical component formed by arraying a plurality of optical fibers is widely known. The optical component has an incident plane and an exit plane exposing the core and clad of each optical fiber, and the optical image entering the incident plane is transmitted to the exit plane.

This optical component has numerous benefits including a high transmission efficiency and a smaller in size of optical system as compared with the lens, and is hence used in various fields such as fingerprint detecting system.

SUMMARY OF THE INVENTION

The optical component is usually manufactured by arraying and bundling a plurality of optical fibers in circular or square section, and forming integrally. Therefore, due to pressure at the time of integral forming, the section of the core of optical fibers for composing the optical component is transformed into polygonal shapes having mutually parallel diagonals such as square and hexagon, and the following problems occur.

That is, the light entering the incident plane with a specific incident angle is reflected repeatedly on the mutually parallel diagonals, and leaves the exit plane with a specific exit angle. As a result, a pattern having an intensity only in a specific exit angle is formed on the output image emitted from the exit plane, and this pattern becomes noise to lower the resolution of the optical component.

It is hence an object of the invention to solve such problems and prevent occurrence of pattern noise, and present an optical component of high resolution.

To solve the problems, the optical component of the invention is an optical component formed by arraying a plurality of optical fibers, in which each optical fiber comprises a first core, a second core formed around the first core and having a smaller refractive index than that of the first core, and a clad formed around the second core and having a smaller refractive index than that of the second core.

Since each fiber has the first core and the second core having a smaller refractive index, if the light enters the incident lane at a specific incident angle, the light entering the first core and the light entering the second core are different in the path of light progress, and it prevents formation of pattern having an intensity only in a specific exit angle. As a result, pattern noise is prevented, and an output image high in resolution can be obtained.

BRIEF DESCRIPTION OF THE DRAWINGS

FIG. 2A to FIG. 2E are manufacturing process charts of optical fiber for composing the optical component.

FIG. 2F to FIG. 2H are sectional views of base materials manufactured in each process.

FIG. 11A to FIG. 11C are manufacturing process charts of optical component in a prior art.

FIG. 12A to FIG. 12C are manufacturing process charts of optical component in a prior art.

FIG. 13A to FIG. 13C are manufacturing process charts of optical component in a prior art.

DESCRIPTION OF THE PREFERRED EMBODIMENTS

Figure 1A:
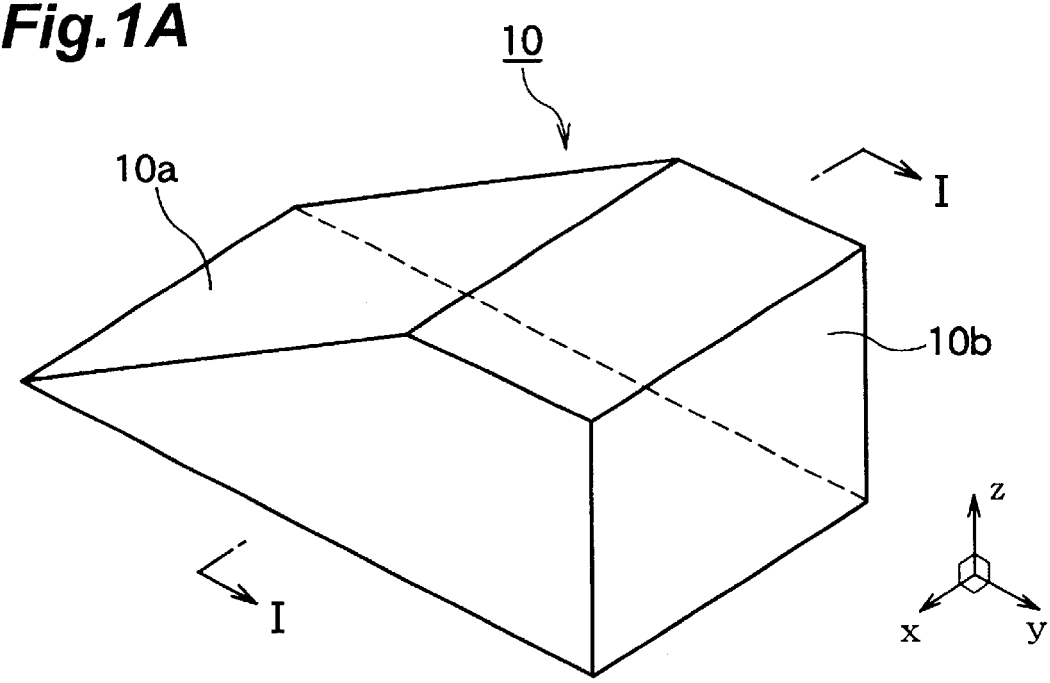
FIG. 1A is a perspective view of an optical component according to an embodiment of the invention.

An optical component according to an embodiment of the invention is described below while referring to the drawings. First, the structure of the optical component of the embodiment is explained. FIG. 1A is a perspective view of the optical component of the embodiment, FIG. 1B is a magnified sectional view along line I—I (a straight line parallel to x-axis) in FIG. 1A, and FIG. 1C is a diagram showing a refractive index distribution along line II—II in FIG. 1B.

An optical component 10 is formed by arraying a plurality of optical fibers parallel to each other. Each optical fiber is arrayed so that its fiber axis may be parallel to the y-axis in FIG. 1A, and the optical component 10 has an incident plane 10a being cut obliquely to the fiber axis, and an exit plane 10b being cut vertically to the fiber axis, in which the input pattern entering the incident plane 10a is reduced and is emitted from the exit plane 10b.

Figure 1B:
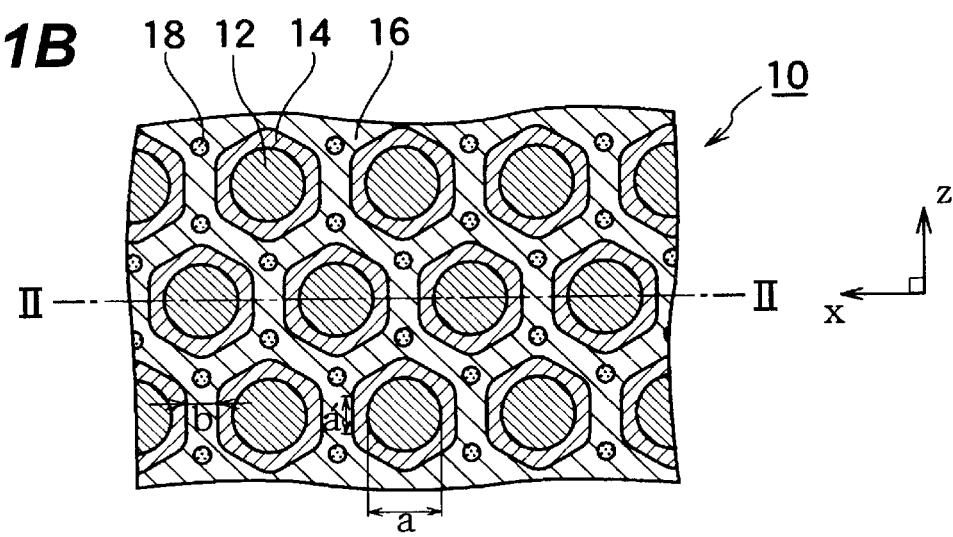
FIG. 1B is a magnified sectional view along line I—I in FIG. 1A.
Figure 1C:
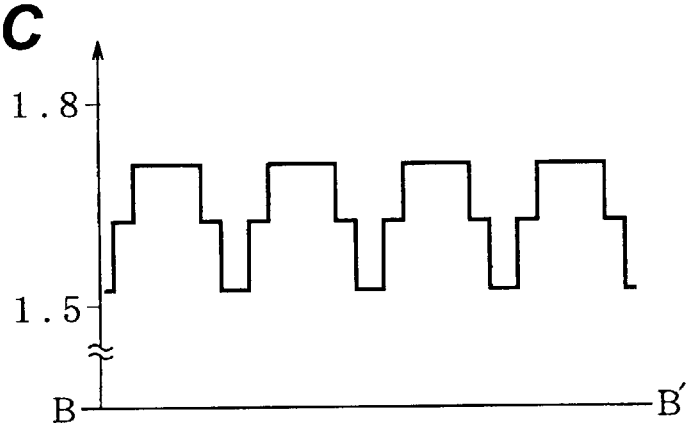
FIG. 1C is a diagram showing a refractive index distribution along line II—II in FIG. 1B.

The optical component 10, as shown in FIG. 1B, has a plurality of optical fibers comprising a first core 12, a second core 14 formed around the first core, and a clad 16 formed around the second core 14, arrayed regularly so that, the fiber axes may be parallel to each other. Between the optical fibers, a light absorbent 18 is provided for removing stray light in the optical component 10, and the clad 16 of each optical fiber is integrally formed by heating and pressing, and fills up the gap between adjacent optical fibers.

Further, in FIG. 1B, the section of the first core 12 is nearly circular, and the section (outer circumference) of the second core 14 is a nearly regular hexagon with crushed corners. To form the section of the first core 12 and second core 14 in such shape, in the optical fiber heating and pressing process, materials of the first core 12 and second core 14 should be selected so that the viscosity of the first core 12 may be larger than the viscosity of the second core 14.

Herein, to prevent band-like progress of light shown in the prior art as far as possible, it is advantageous when the diameter (a) of the first core 12 is larger than the width (a') of the linear portion (or the portion close to the linear portion) of the section of the second core 14. The width (b) of the clad 16 for filling up the gap between cores is required to have a sufficient thickness to function as the clad, and in particular it is preferred to be more than ½ of the wavelength (550 nm) being used generally in the optical component 10.

In the optical component 10 of the embodiment, the diameter (a) of the first core 12 is about 10 μm, the width (a') of the flat portion of the section of the second core 14 is about 5 μm, the width (b) of the clad 16 filling up the gap of cores is about 2 μm, and the thickness of the second core 14 is about 2 μm.

The first core 12 is made of, for example, Ba-La glass with refractive index $n_1$ of 1.71, the second core 14 is made of, for example, lead glass with refractive index $n_2$ of 1.62, and the clad 16 is made of, for example, soda lime glass with refractive index $n_c$ of 1.52. Therefore, the refractive index distribution along line II—II in FIG. 1B is as shown in FIG. 1C. As clear from the refractive indices of the first core 12, second core 14 and clad 16, the refractive index $n_2$ of the second core 14 is smaller than the refractive index $n_1$ of the first core 12, and the refractive index $n_c$ of the clad 16 is smaller than the refractive index $n_2$ of the second core 14, and further the refractive index $n_1$ of the first core 12, the refractive index $n_2$ of the second core 14, and the refractive index $n_c$ of the clad 16 satisfy the following relation.

$$n_1^2 - n_2^2 = n_2^2 - n_c^2 \quad (1)$$

A manufacturing method of the optical component of the embodiment is explained. FIG. 2A to FIG. 2E are manufacturing process charts of the optical fiber for composing the optical component 10, and FIG. 2F to FIG. 2H are sectional views of base materials and others manufactured in each process.

To manufacture the optical fiber for composing the optical component 10, in the first place, same as in manufacture of ordinary optical fiber, a first core base material 20 having a circular columnar shape is manufactured (FIG. 2A, FIG. 2F) The first core base material 20 is made of, for example, Ba-La glass with refractive index of 1.71, and its side surface is polished by seria polishing or other method.

In succession, the second core base material 22 having a pipe shape as shown in FIG. 2B is filled up with the first core base material 20 manufactured in the above process (FIG. 2C, FIG. 2G). Herein, the second core base material 22 is made of, for example, lead glass with refractive index of 1.62, and its inner surface and outer surface are polished by seria polishing or other method.

The first core base material 20 placed in the second core base material 22 manufactured in the above process is inserted into a clad base material 24 having a pipe shape as shown in FIG. 2D, and a base material 26 for manufacturing an optical fiber is manufactured (FIG. 2E, FIG. 2H). Herein, the clad base material 24 is made of, for example, soda lime glass with refractive index of 1.52, and one bottom 24a of the clad base material 24 is sealed by burner or other melting method.

Figure 3:
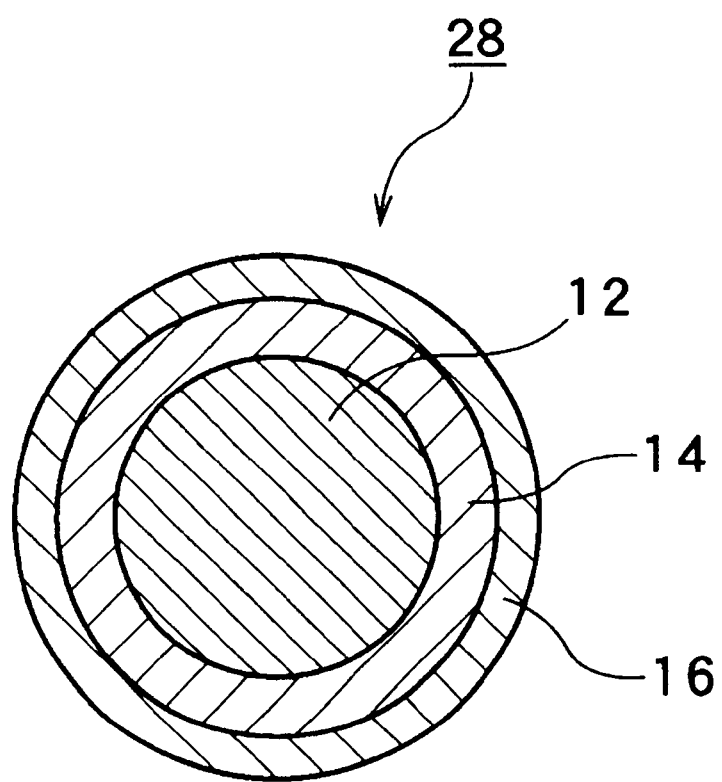
FIG. 3 is a magnified sectional view of optical fiber used in manufacture of the optical component.

Later, this base material 26 is drawn in wire, and an optical fiber is manufactured. A magnified sectional view of the optical fiber manufactured in this method is shown in FIG. 3. The optical fiber 28 is formed of the first core 12 (refractive index $n_1$=1.71), second core 14 (refractive index $n_2$=1.62) formed around the first core 12, and clad 16 (refractive index $n_c$=1.52) formed around the second core 14.

The plurality of optical fibers 28 thus manufactured in the above process are disposed parallel to each other while properly disposing the light absorbent 18 in the gaps thereof, and formed integrally by heating and pressing, so that the optical component 10 is manufactured.

The operation of the optical component in this embodiment is explained below. To begin with, problems of the optical component of the prior art are clarified. In manufacture of optical component according to the prior art, usually, a plurality of optical fibers with circular or square section are disposed and bundled parallel to each other, and formed integrally. Or, to enhance the resolution of the optical component, the bundled optical fiber group is further drawn in wires (multi-fibers), and disposed parallel, bundle and formed integrally, or by repeating the drawing process and bundling process plural times (multi-multi-fibers), the optical component is formed integrally.

In the manufacturing process of the optical component by such manufacturing method, changes in sectional shape of the core of each optical fiber are shown in FIG. 11A to FIG. 1C, FIG. 12A to FIG. 12C, and FIG. 13A to FIG. 13C. FIG. 11A to FIG. 11C show changes in sectional shape of a core 2 when an optical component 6 is formed by disposing optical fibers 4 with the core 2 having a circular section at four corners. When the optical component 6 is formed by disposing the optical fibers 4 with the core 2 having a circular section at four corners, as shown in FIG. 11A to FIG. 11C, by heating and pressing process when forming integrally by bundling the optical fibers 4, the section of the core 2 of each optical fiber 4 is deformed into a nearly square shape.

Herein, the degree of deformation varies with the hardness of the core 2 and clad 8 of the optical fiber 4 under temperature in the heating and pressing process. If the core 2 is extremely hard as compared with the clad 8, the core 2 can be maintained in a circular section, but in order to avoid mutual contact of adjacent cores 2, it is practically difficult to increase the hardness of the core 2 extremely as compared with the clad 8.

FIG. 12A to FIG. 12C show changes in the sectional shape of the core 2 when the optical component 6 is formed by disposing optical fibers 4 with the core 2 having a circular section at six corners. In this case, by heating and pressing process when forming integrally by bundling the optical fibers 4, the section of the core 2 of each optical fiber 4 is deformed into a nearly hexagonal shape. FIG. 13A to FIG. 13C show changes in the sectional shape of the core 2 when the optical component 6 is formed by disposing optical fibers 4 with the core 2 having a square section at four corners. In this case, since there is no gap between the adjacent clads 8 when disposing each optical fiber 4, the section of the core 2 is maintained in square even after heating and pressing process when forming integrally by bundling the optical fibers 4.

Figure 14A:
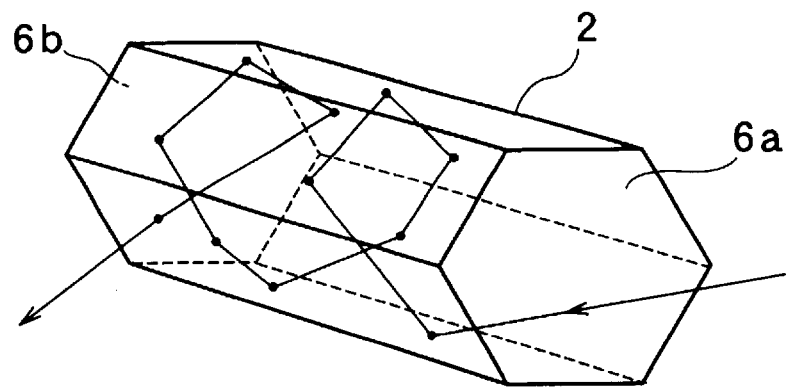
FIG. 14A to FIG. 14C are diagrams showing the mode of progress of light in the core of optical fiber for composing the optical component in a prior art.
Figure 14B:
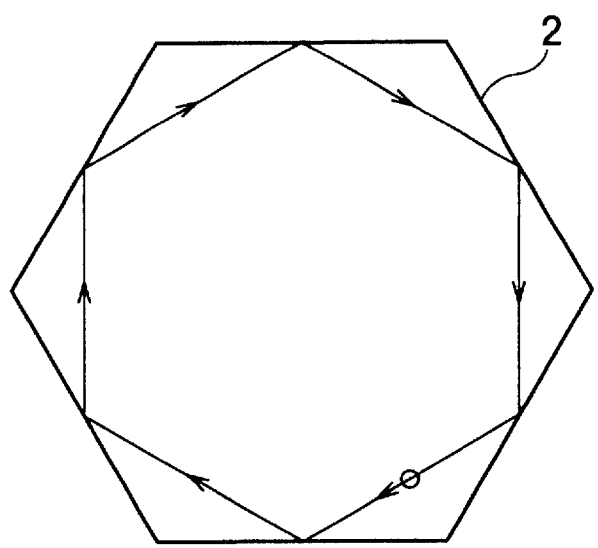
Figure 14C:
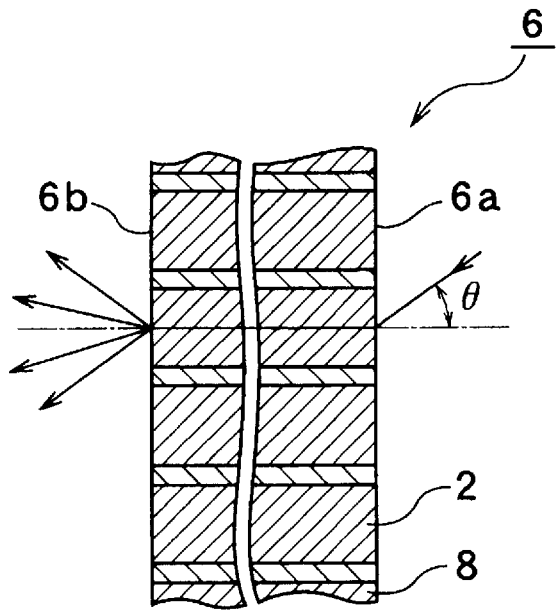
Figure 15A:
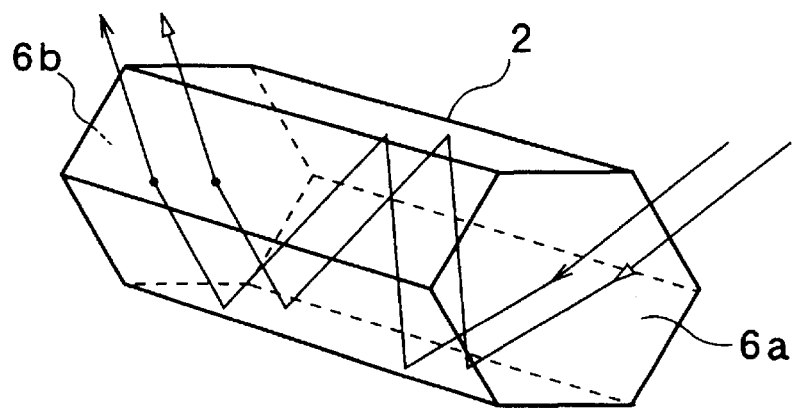
FIG. 15A to FIG. 15C are diagrams showing the mode of progress of light in the core of optical fiber for composing the optical component in a prior art.
Figure 15B:
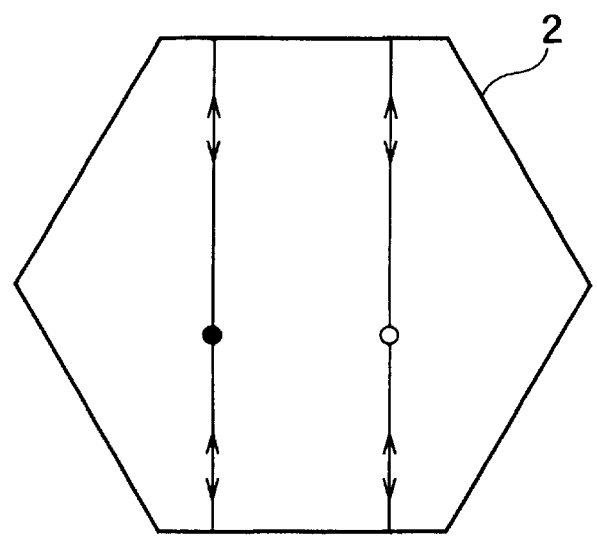
Figure 15C:
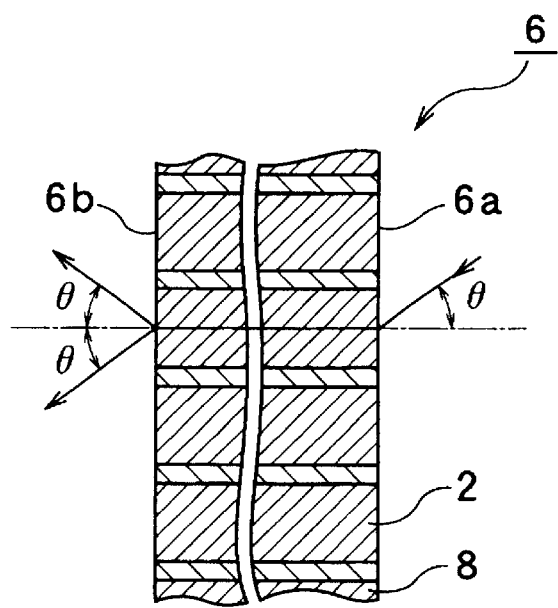

In thus manufactured optical component 6, since the section of the core 2 of each optical fiber 4 is a polygon having mutually parallel diagonals such as square and hexagon, the following problems are known. That is, the progress of the light entering the incident plane of the optical component 6 in the core 2 may take place in two modes, that is, spiral progress as shown in FIG. 14A to FIG. 14C, and band-like progress as shown in FIG. 15A to FIG. 15C. In FIG. 14A to FIG. 14C and FIG. 15A to FIG. 15C, the white circles and black circles show the light incident positions.

FIG. 14A shows the mode of progress of the light entering the incident plane (core 2 incident plane) 6a of the optical component 6 within the core 2, and FIG. 14B is a projection of the light progress locus on a plane parallel to the incident plane 6a. As shown in FIG. 14A and FIG. 14B, the light entering the incident plane 6a of the optical component 6 at random incident angles (excluding the specified incident angle explained in FIG. 15A to FIG. 15C) progresses spirally in the core 2. As a result, as shown in FIG. 14C, if the light enters the incident plane 6a of the optical component 6 at a specific incident angle θ, it is emitted at various exit angles from the exit plane 6b of the optical component 6 due to difference in the incident position.

On the other hand, as shown in FIG. 15A and FIG. 15B, the light entering the incident plane 6a of the optical component 6 at a specified incident angle (the incident angle allowing the light to reflect and progress only on the parallel opposite planes of the core 2) progresses in the core 2 in a band pattern. As a result, as shown in FIG. 15C, the light entering the incident plane 6a of the optical component 6 at specific incident angle θ is emitted from the exit 6b of the optical component 6 also at the same exit angle θ regardless of difference in the incident position. Therefore, in the output image emitted from the exit plane 6b of the optical component 6, a pattern having an intensity only in a specific exit angle is formed, and this pattern becomes noise to lower the resolution of the optical component 6. In particular, since the optical component manufactured by integrally forming multi-fibers (same in multi-multi-fibers) differs in the degree of deformation of the core 2 between the central part and edge part of the multi-fibers, pattern noise depending on the sectional shape of the multi-fibers is caused due to difference in the degree of deformation, and-the resolution of the optical component 6 is extremely lowered.

Figure 4:
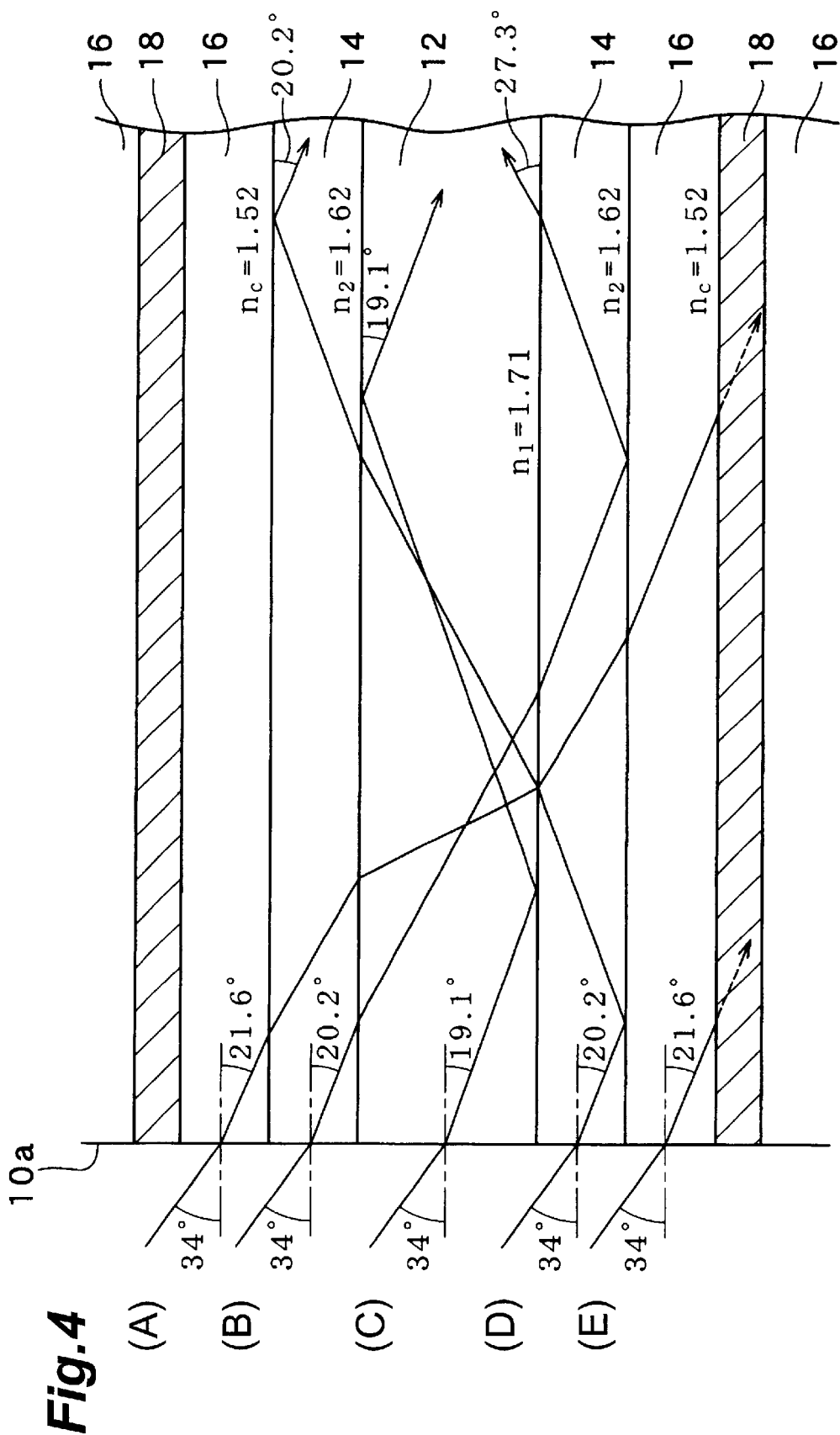
FIG. 4 is a diagram showing the mode of progress of light in the core of optical fiber for composing the optical component.

By contrast, the optical component 10 of the embodiment is as follows. FIG. 4 shows the path of the light entering the incident plane 10a of the optical component 10 and advancing in the first core 12 and second core 14, expressed by the ray entering the plane passing through the fiber central axis. For the sake of simplicity, herein, supposing the incident plane 10a is vertical to the fiber axis, the light entering the incident plane 10 a with a maximum light receiving angle (34° C.) is explained.

The light entering the incident plane 10a runs through the path as shown in FIGS. 4(A) to (E) depending on the incident position. The light entering the clad 16 from the incident plane 10a (FIG. 4(A) or (E)) enters the light absorbent 18 directly from the clad 16, and is attenuated and extinguished (FIG. 4(E)), or is refracted and progresses through the second core 14, first core 12, and second core 14, and enters the light absorbent 18, and is attenuated and extinguished (FIG. 4(A)).

The light entering the second core 4 from the incident plane 10a (FIG. 4(B) or (D)) is refracted at the interface of the second core 14 and first core 12, and is reflected totally at the interface of the second core 14 and clad 16 repeatedly, and progresses in the first core 12 and second core 14. At this time, the light runs in the first core 12 with an angle of 27.3° C. to the fiber axis, and in the second core 14 with an angle of 20.2° C. to the fiber axis.

Further, the light entering the first core 12 from the incident plane 10a (FIG. 4(C)) repeats total reflection at the interface of the first core 12 and second core 14, and advances in the first core 12. At this time, the light runs in the first core 12 with an angle of 19.1° C. to the fiber axis.

Therefore, if the light enters the incident plane 10a of the optical component 10 at a specific incident angle, the light is emitted from the exit plane 10b of the optical component 10 at various exit angles due to difference in the incident position, so that pattern having an intensity only in a specific exit angle is not formed.

Further, since the refractive index $n_1$ of the first core 12, refractive index $n_2$ of the second core 14, and refractive index $n_c$ of the clad 16 are related as shown in formula (1), the maximum light accepting angle may be matched between the light entering the first core and the light entering the second core.

The effects of the optical component of the embodiment are explained. In the optical component 10, the optical fibers for composing the optical component 10 are formed by the first core 12, second core 14 having a smaller refractive index than the first, core 12, and clad 16 having a smaller refractive index than the second core 14. Therefore, of the incident plane 10a of the optical component 10, the light entering the first core 12 and the light entering the second core 14 at a specific angle progress through different paths.

Further, since the section of the first core 12 is nearly circular, the light entering the first core 12 progresses spirally, except for the light entering long the plane including its central axis. Also the light entering the second core 14 progresses spirally by repeating reflection on the interface of the first core 12 and second core 14 and the interface of the second core 14 and clad 16, except for the light entering the plane vertical to the plane portion on the outer circumference of the second core 14 including the central axis of the first core 12.

As a result, any pattern having an intensity only in a specific exit angle is not formed, and pattern noise can be prevented, and therefore an output image of a high resolution can be obtained from the exit plane 10b of the optical component 10.

Further, the optical component 10 can match the maximum light receiving angle between the light entering the first core and the light entering the second core, so that it can avoid the situation of the light entering at a specific incident angle that the light entering the first core is transmitted in the optical component 10 but the light entering the second core is not transmitted in the optical component 10. Therefore, the portion of the second core 14 does not become a dead zone to lower the resolution.

Figure 5A:
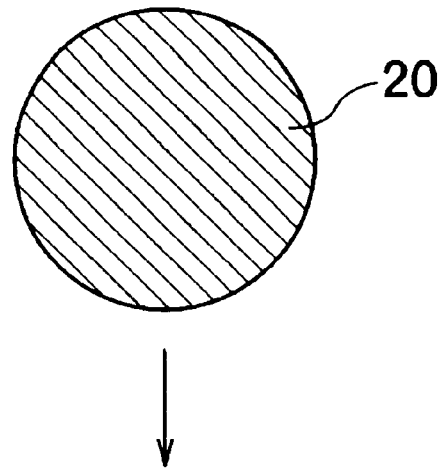
FIG. 5A to FIG. 5C are manufacturing process charts of optical component in the embodiment of the invention.
Figure 5B:
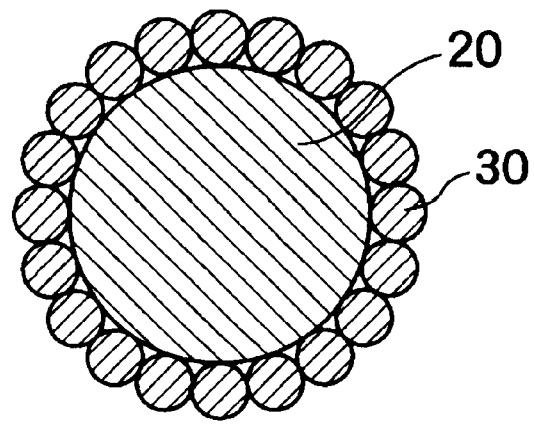
Figure 5C:
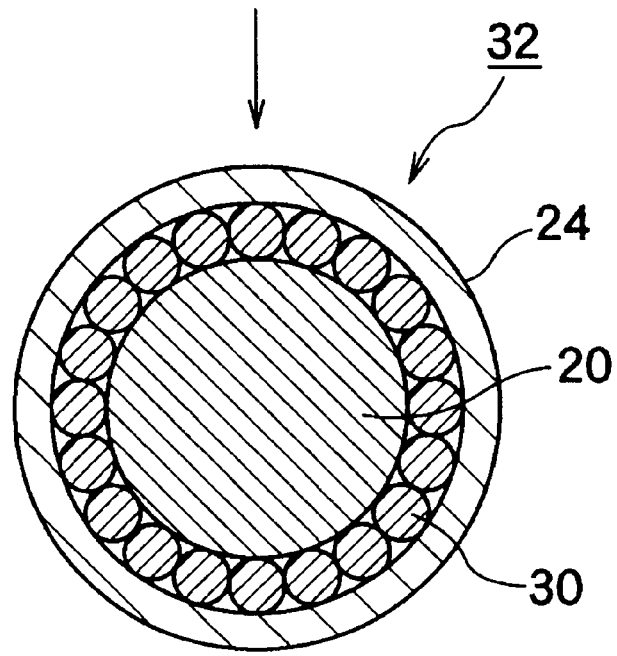

In the embodiment, in order to form the optical fibers 28 for composing the optical component 10, base materials 26 are formed in the method shown in FIG. 2A to FIG. 2E, but the method shown in FIG. 5A to FIG. 5C may be also applicable. That is, in the first place, a first core base material 20 having a circular columnar shape is manufactured (FIG. 5A), and a plurality of second core base materials 30, having a circular columnar shape of a smaller diameter than the first core base material 20 are disposed around it (FIG. 5B). The first core base material 20 surrounded with the core base materials 30 manufactured in this process is charged into a clad base material 24 of pipe shape, and a base material 32 for manufacturing optical fiber is manufactured (FIG. 5C). One bottom 24a of the clad base material 24 is sealed by burner or other melting method. The subsequent process, that is, formation of the optical fiber 28 by drawing the base material 32 in wire and formation of optical component 10 are same as mentioned above.

Figure 6A:
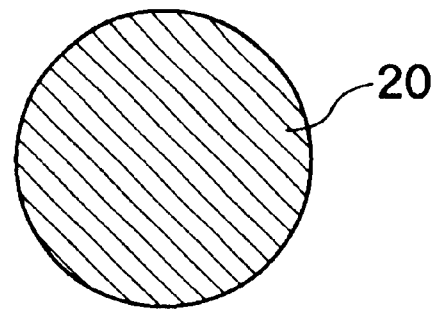
FIG. 6A to FIG. 6C are manufacturing process charts of optical component in the embodiment of the invention.
Figure 6B:
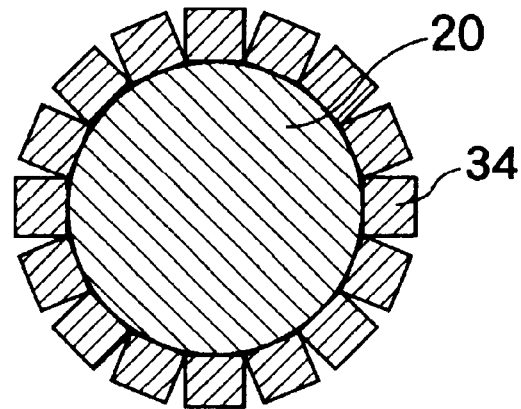
Figure 6C:
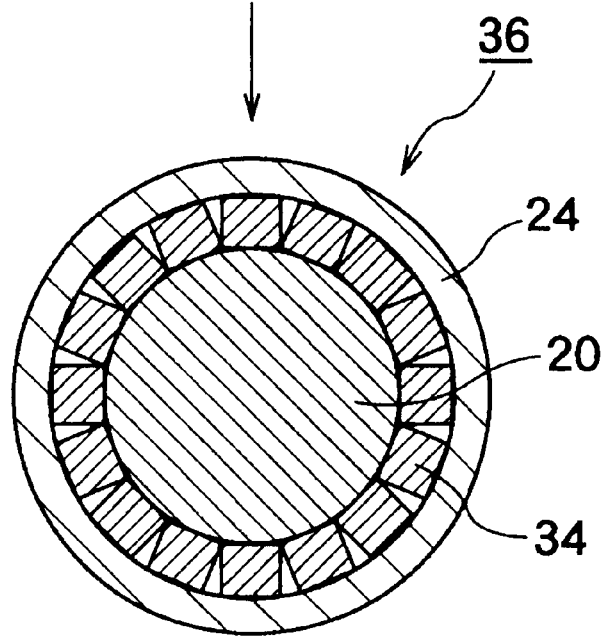

The base materials for forming the optical fibers 28 for composing the optical component 10 may be also manufactured in the method shown in FIG. 6A to FIG. 6C. That is, a first core base material 20 having a circular columnar shape is manufactured (FIG. 6A), and a plurality of second core base materials 34 having a square columnar shape in a section having one side smaller than the diameter of the first core base material 20 are disposed around it (FIG. 6B). The first core base material 20 surrounded with the core base materials 34 manufactured in the above process is put in a clad base material 24 having a pipe shape, and a base material 36 for manufacturing optical fibers is made (FIG. 6C). One bottom 24a of the clad base material 24 is sealed by burner or other melting method. The subsequent process, that is, formation of the optical fiber 28 by drawing the base material 36 in wire and formation of optical component 10 are same as mentioned above.

In the embodiment, the sectional structure of the optical component 10 is as shown in FIG. 1B, but various modified examples are considered as far as each optical fiber for composing the optical component 10 comprises a first core 12, a second core 14 disposed around the first core 14, and a clad 16 disposed around the second core 14.

Figure 7:
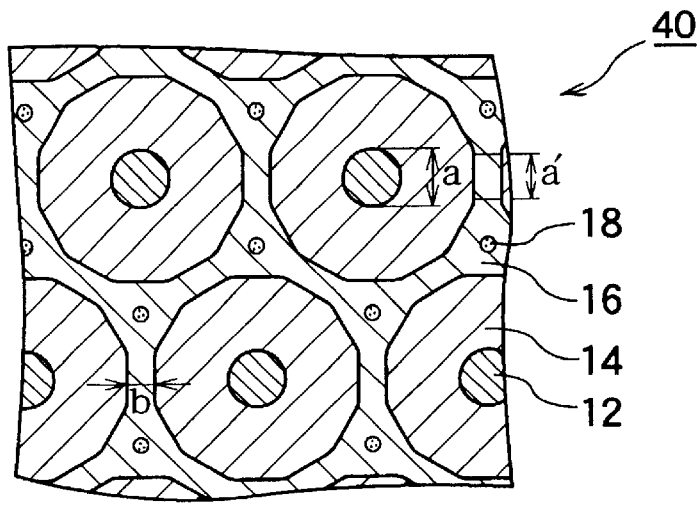
FIG. 7 is a magnified sectional view of a first modified example of optical component in the embodiment of the invention.

FIG. 7 is a magnified sectional view of an optical component 40 in a first modified example. What the optical component 40 differs from the optical component 10 in the above embodiment is that the optical component 40 has a smaller diameter in the first core 12 as compared with the optical component 10. At this time, the sectional shape of the second core 14 has crushed corners in the nearly hexagonal shape (because of the light absorbent 18). Herein, to prevent band-like progress known in the prior art as much as possible, the diameter (a) of the first core 12 is preferred to be larger than the width (a') of the linear portion (or the portion close to the linear portion) of the section of the second core 14. Further, it is also required that the width (b) of the clad 16 for filling up the gap of each core should have a sufficient thickness to function as the clad.

Figure 8:
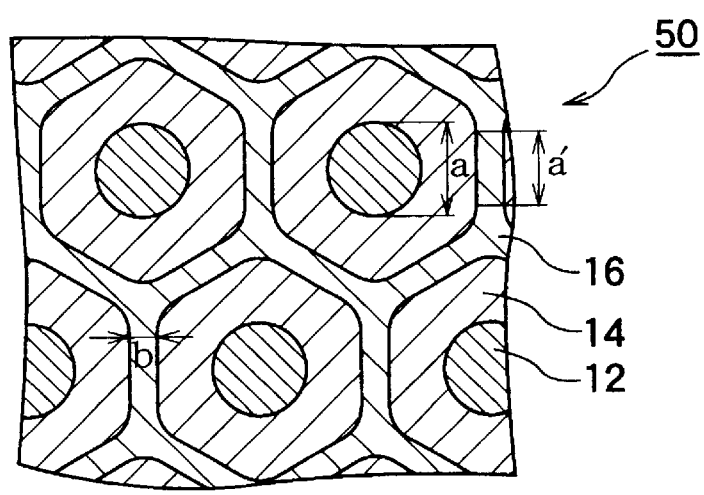
FIG. 8 is a magnified sectional view of a second modified example of optical component in the embodiment of the invention.

FIG. 8 is a magnified sectional view of an optical component 50 in a second modified example. What the optical component 50 differs from the optical component 10 in the above embodiment is that the optical component 50 does not have light absorbent 18. In this case, too, in order to prevent band-like progress known in the prior art as much as possible, the diameter (a) of the first core 12 is preferred to be larger than the width (a') of the linear portion (or the portion close to the linear portion) of the section of the second core 14. Likewise, it is also required that the width (b) of the clad 16 for filling up the gap of each core should have a sufficient thickness to function as the clad.

Figure 9:
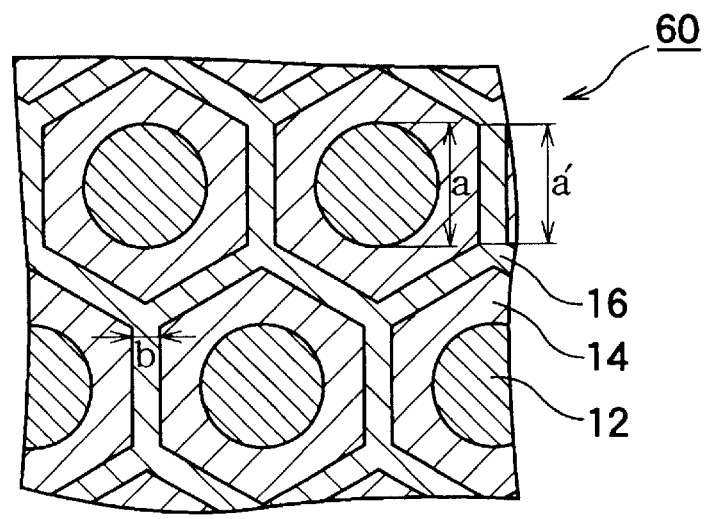
FIG. 9 is a magnified sectional view of a third modified example of optical component in the embodiment of the invention.

FIG. 9 is a magnified sectional view of an optical component 60 in a third modified example. What the optical component 60 differs from the optical component 50 of the second modified example is that the optical component 60 has a flat shape in the interface (outer circumference) of the second core 14 whereas the optical component 50 has a curved shape in the interface (outer circumference) of the second core 14. The optical component 60 having such sectional shape can be obtained by selecting the materials for the second core 14 and clad 16 so that the viscosity of the second core 14 may be extremely small as compared with the viscosity of the clad 16 in the heating and pressing process of the optical fiber. In this case, too, in order to prevent the band-like progress of the light mentioned in the prior art as far as possible, it is advantageous when the diameter (a) of the first core 12 is larger than the width (a') of the linear portion of the section of the second core 14. Also it is required that the width (b) of the clad 16 for filling up the gap of each core should have a sufficient thickness to function as the clad.

Figure 10:
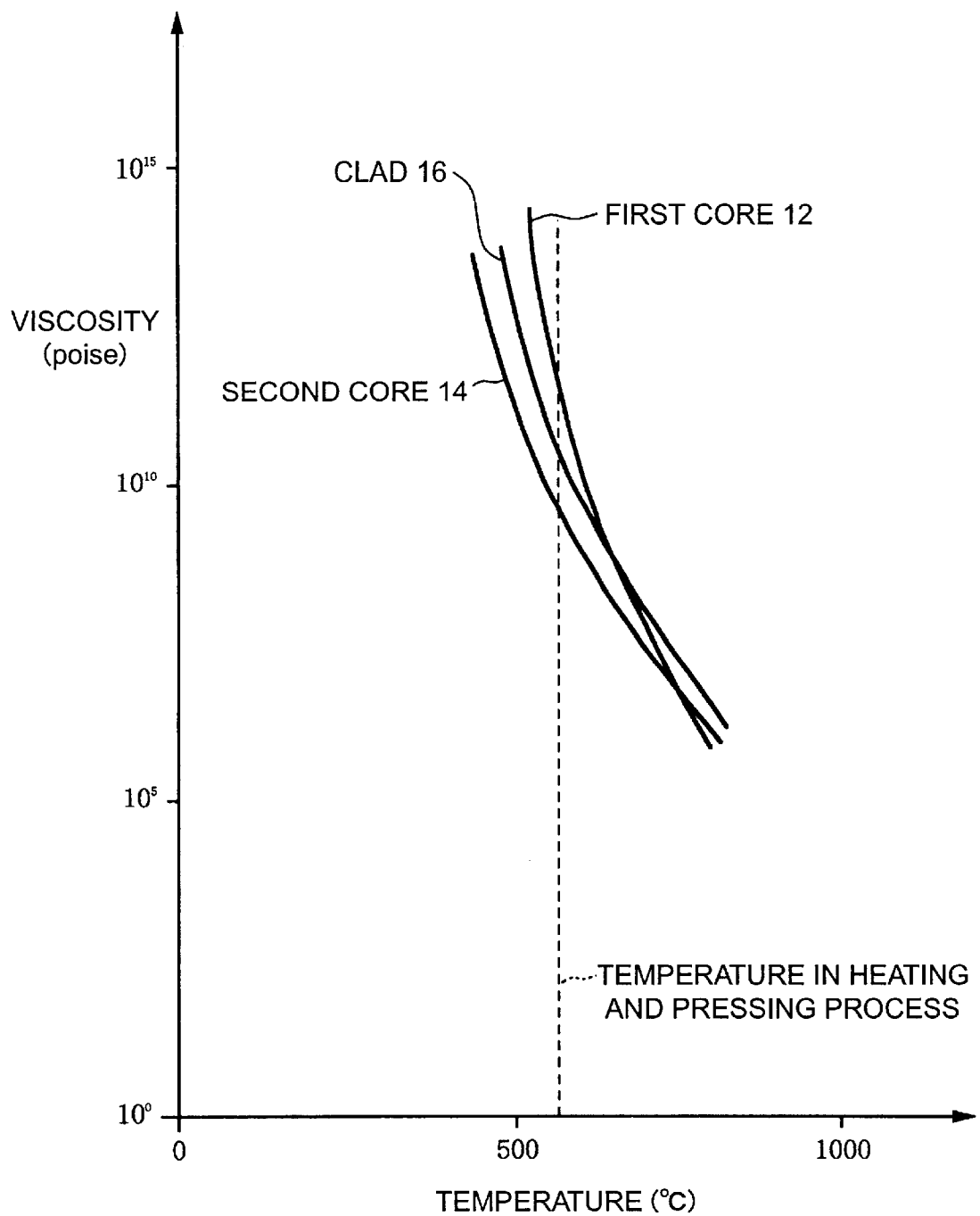
FIG. 10 is a diagram showing the relation between the ambient temperature and viscosity.

For reference, FIG. 10 shows changes of the viscosity of the first core 12, second core 14 and clad 16 in relation to the ambient temperature. As known from FIG. 10, at the temperature (about 600° C.) of heating and pressing process of the optical fiber, as compared with the viscosity of the clad 16 and viscosity of the first core 12, the viscosity of the second core 14 is smaller. From the viewpoint of strength of optical fibers, the coefficient of thermal expansion is preferred to be smaller in the sequence of the first core 12, second core 14 and clad 16. That is, if the coefficient of thermal expansion of the central portions of the optical fiber is large, compressive stress is generated in the surface of the optical fiber, and the strength of the optical fiber increases and crack is less likely to occur.

The optical components 10, 40, 50, and 60 in the foregoing embodiments are optical parts formed by arraying a plurality of optical fibers parallel to each other, but the optical components may be formed also in a taper shape for emitting the light entering the incident plane in a magnified or reduced image, by arraying a plurality of optical fibers in a curved form.

This optical component has numerous benefits including a high transmission efficiency and a smaller size of optical system as compared with the lens, and is hence used in various fields such as fingerprint detecting system and radiation detector.

What is claimed is:

1. An optical component formed by arraying a plurality of optical fibers, each optical fiber comprising a first core, a second core formed around said first core and having a refractive index smaller than that of the first core, and a clad formed around said second core and having a refractive index smaller than that of the second core, wherein refractive index $n_1$ of said first core, refractive index $n_2$ of said second core, and refractive index $n_c$ of said clad satisfy the relation of $$n_1^2 - n_2^2 = n_2^2 - n_c^2.$$

2. An optical component integrally formed by heating and pressing a plurality of optical fibers to form an array of the plurality of optical fibers, each optical fiber comprising a first core, a second core formed around said first core and having a refractive index smaller than that of the first core, and a clad formed around said second core and having a refractive index smaller than that of the second core, wherein the sectional shape of said first core is circular such that light entering said first core progresses spirally, except for the light entering along a plane including a central axis of said first core.

3. An optical component according to claim 1, wherein the sectional shape of said first core is circular such that light entering said first core progresses spirally, except for the light entering along a plane including a central axis of said first core.

4. An optical component formed by arraying a plurality of optical fibers, each optical fiber comprising a first core, a second core formed around said first core and having a refractive index smaller than that of the first core, and a clad formed around said second core and having a refractive index smaller than that of the second core, and the sectional shape of said second core being a near polygonal shape having at least two sides opposed to each other, said two sides being parallel to each other.

5. An optical component according to claim 4, wherein the sectional shape of said first core is circular such that light entering said first core progresses spirally, except for the light entering along a plane including a central axis of said first core.

6. An optical component according to claim 4, herein refractive index $n_1$ of said first core, refractive index $n_2$ of said second core, and refractive index $n_c$ of said clad satisfy the relation of:

$$n_1^2 - n_2^2 = n_2^2 - n_c^2.$$

* * * * *